United States Patent [19]
Bone et al.

[11] 3,883,672
[45] May 13, 1975

[54] METHOD OF MAKING A DRY TYPE PET FOOD HAVING A MEAT-LIKE TEXTURE AND COMPOSITION THEREOF

[75] Inventors: David P. Bone, Palatine; Edward L. Shannon, Barrington, both of Ill.

[73] Assignee: The Quaker Oats Company, Chicago, Ill.

[22] Filed: June 12, 1974

[21] Appl. No.: 478,888

[52] U.S. Cl. ............... 426/311; 426/72; 426/343; 426/364; 426/373; 426/805
[51] Int. Cl. ............................................... A23j 3/00
[58] Field of Search ............ 426/72, 805, 311, 272, 426/364, 213, 152, 343, 373, 380, 212

[56] References Cited
UNITED STATES PATENTS

| | | | |
|---|---|---|---|
| 1,776,055 | 9/1939 | Weber | 426/152 X |
| 2,774,670 | 12/1956 | Albert | 426/72 |
| 3,380,832 | 4/1968 | Bone | 426/272 X |
| 3,467,525 | 9/1969 | Hale et al. | 426/805 X |
| 3,658,550 | 4/1972 | Hawley | 426/364 X |
| 3,765,902 | 10/1973 | Charber | 426/92 X |

*Primary Examiner*—S. Leon Bashore
*Assistant Examiner*—Kenneth M. Schor
*Attorney, Agent, or Firm*—Richard H. Shear

[57] ABSTRACT

A method is described for producing a dry pet food having a moisture content less than 15 percent by weight. A substantially solid, marbled, meat-like texture is obtained that remains soft and elatic during normal storage for up to 24 months. The marbled texture and appearance is obtained by uneven cooking within a single dough processed at an average temperature between 145°F. and 190°F., said dough containing specific types of proteinaceous adhesives in conjunction with plasticizing agents and not more than a limited amount of amylaceous ingredients.

16 Claims, 1 Drawing Figure

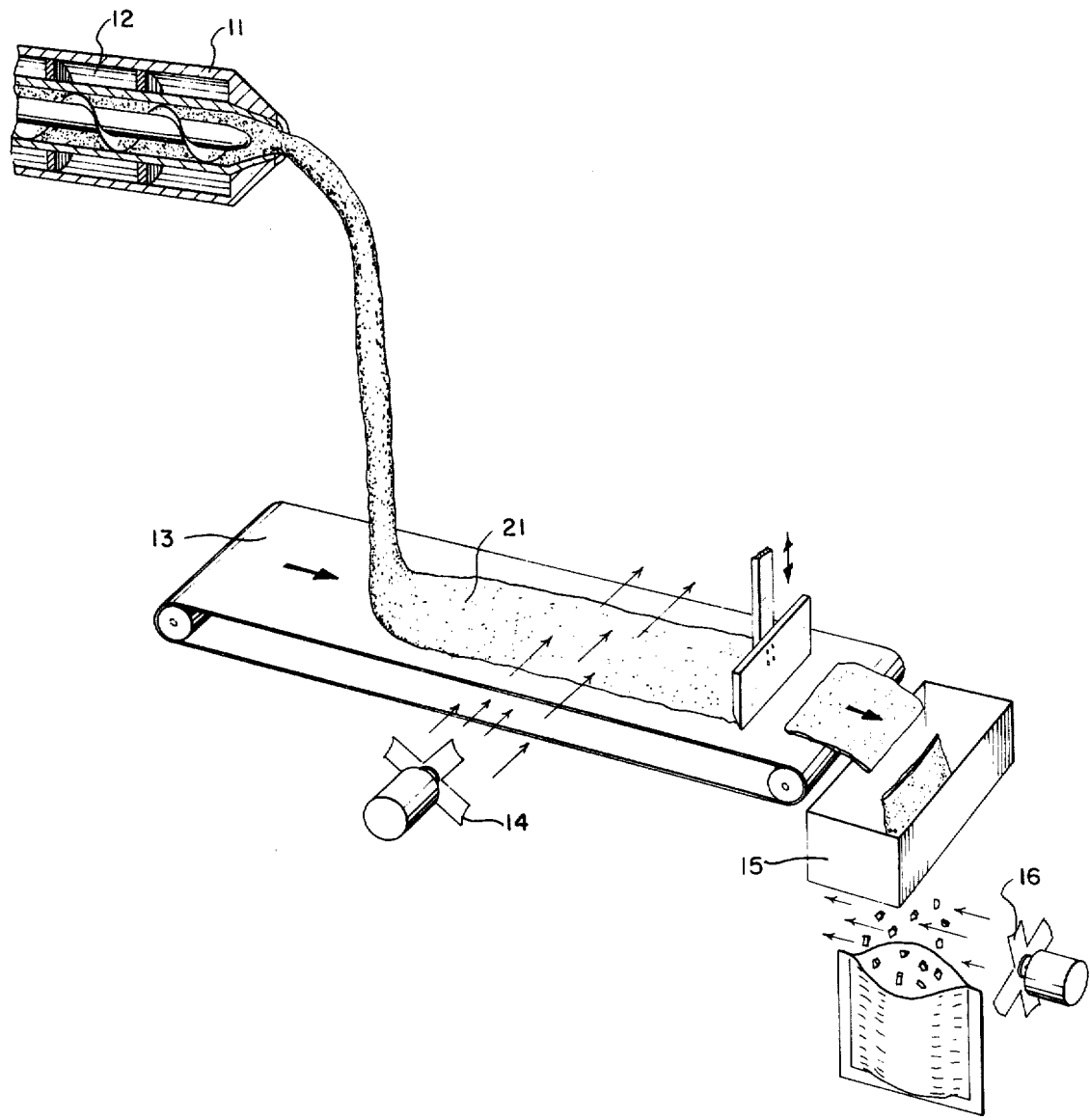

3,883,672

METHOD OF MAKING A DRY TYPE PET FOOD HAVING A MEAT-LIKE TEXTURE AND COMPOSITION THEREOF

BACKGROUND OF THE INVENTION

1. Field of the Invention

This invention relates to a marbled, dry, meaty pet food that is soft, elastic, and substantially meat-like in texture and appearance and which has a moisture content of less than 15 percent by weight. By "marbled" pet food is meant a pet food resembling meat having fatty tissue embedded within the meat.

2. Description of the Prior Art

Currently, marbled pet foods do not exist as dry pet foods, but only as semi-moist or moist pet foods such as described by U.S. Pat. No. 3,380,832. Further, there are no marbled dry pet foods that have the desired attributes of meat-like softness and elasticity during normal storage. Rather, conventional dry pet foods are described as being hard and brittle, with only nominal meat-like characteristics and palatability. Due to the hard, brittle nature of these conventional dry pet foods, their particle size is usually relatively small. Further, it is often necessary to moisten them or mix them with moist foods in order to increase their palatability to a sufficient degree to obtain consumption. Once moistened, the conventional dry pet foods are subject to rapid deterioration. Furthermore, as shown by the following formulation that is typical of conventional dry pet food, their content of amylaceous ingredients including cereal grains is often as high as 50 percent.

|  | Percent by Weight |
|---|---|
| Amylaceous ingredients | 24–50 |
| Animal protein source | 5–25 |
| Vegetable protein source | 10–30 |
| Fat source | 5–15 |
| Supplements (vitamins, minerals, flavorings, etc.) | 1–7 |
| Water | 5–15 |

The amylaceous content at any level, and especially at a high level of amylaceous ingredients, is a stigma against the meat image that pet food manufacturers attempt to establish in their products. In addition, the high content of amylaceous ingredients in conventional dry pet foods in an important contributing factor in establishing their typical hard, brittle structure.

Conventional marbling of dry pet food has not heretofore been accomplished. Methods of marbling as described in U.S. Pat. No. 3,380,832 involve a blending of separately processed semi-moist formulations thereby requiring the expense of two process lines to produce a unit of product. Currently, there is no marbled pet food, either dry or semi-moist, that is produced from a single dough or mix processed through a single cooking apparatus.

For these reasons, there is a need for a dry type pet food which has a soft, elastic, marbled meat-like texture and appearance, little or not amylaceous ingredients, high palatability when consumed dry, and produced on a single process stream per unit of product.

SUMMARY OF THE INVENTION

It is, therefore, an object of this invention to provide a method to produce a dry pet food having a soft, elastic, meat-like, marbled texture and appearance which are retained during normal storage.

It is another object of this invention to provide an improved method of marbling.

Yet another object of this invention is to provide a processed pet food which ranks high in palatability and acceptability to animals.

A still further object of this invention is to provide a processed marbled pet food having a moisture content of less than 15 percent and having a substantially solid texture that is soft, elastic, and meat-like in appearance.

These and other objects of this invention are accomplished by mixing conventional dry pet food ingredients along with specific proteinaceous adhesives and plasticizing agents while limiting the use of amylaceous ingredients to 25 percent by weight or less and further processing the mixture at specific temperatures to yield a semi-moist like yet dry pet food resembling marbled meat in both texture and appearance. The pet food thus produced will be capable of being stored as a dry pet food, yet will not need additional moisture to increase its palatability.

BRIEF DESCRIPTION OF THE DRAWING

This invention may be more fully illustrated but is not limited by the enclosed drawings wherein the FIGURE is a perspective view of an apparatus used to carry out the process of the invention.

DETAILED DESCRIPTION OF THE INVENTION

In a co-pending application filed by Bone et al., application Ser. No. 478,761 filed June 12, 1974, filed along with the present application, a dry pet food having a substantially unexpanded or solid texture that is soft, elastic, and meat-like in appearance is disclosed. The present invention relates to a process for producing a dry pet food having a similar composition as that pet food yet having a substantially marbled meat-like texture and appearance due to differences in processing.

By "dry pet food" is meant one that has a moisture content less than 15 percent by weight and typically about 10 percent. Hereinafter, all percentages referred to are understood to be by weight unless specified otherwise and are based upon the weight of the final product. As disclosed in Docket No. 583, these foods are composed of a protein source, amylaceous ingredients such as cereal grains or starch, fats, sugar, a proteinaceous adhesive, and a plasticizing agent. While the quantity of protein source, fat, and sugar, is considered to be within the skill of the art, a typical quantitative range of those ingredients includes from about 0–35 percent protein source, from about 3–15 percent fat, and from 0 to about 35 percent sugar.

Vitamin, mineral, color, flavor, and other known supplements may be used as well to enhance the pet food properties. Among these are choline chloride, $M_gO$, Vitamin A, $B_{12}$, $D_3$, and E, riboflavin, niacin, folic acid, pyridoxine HCl, thiamine mononitrate, Ca panthothenate as vitamin and mineral supplements. Such supplements are commonly used up to about 5 percent of the final product.

By "protein source" is meant additional protein other than that obtained from the required proteinaceous adhesive. The protein source may be employed in order to satisfy the legal and nutritional requirements for protein quantity and quality in the pet food product. Typical protein source ingredients are those normally containing 20 percent or more protein by weight. Examples of protein source ingredients are soybean oil meal, soybean flour, soy protein concentrates, soy protein isolates, meat meal, meat and bone meal, fish meal, blood meal, dried blood plasma, yeast, milk proteins, dried skim milk, cottonseed meal, cottonseed flour, cottonseed protein isolate, peanut meal, peanut flour, peanut protein isolate, corn germ, corn germ meal, wheat germ, wheat germ meal, corn gluten feed, corn gluten meal, corn distiller's dried grains, dried corn distiller's solubles, dried meat solubles, poultry by-product meal, and any other edible proteinaceous foodstuff including animal protein. Fresh meat and meat by-products may also be employed and are particularly useful in imparting palatability. The term "meat" is understood to apply to the flesh of cattle, swine, sheep, goats, horses, whale, and other mammals, poultry, and fish. The term "meat by-products" inlcudes such substituents as are embraced by that term in the *Definition of Feed Ingredients* published by the Association of American Feed Control Officials, Inc.

By the term "sugar" is meant any known sugar utilized in the food art.

Briefly stated, the novel aspects of the present invention involve incorporating into the dry pet food dough one or more proteinaceous adhesives in combination with one or more compatible plasticizing agents and processing in a manner to form a pet food randomly marbled in texture and appearance. This is accomplished by cooking a mass of dough in a manner such that a portion of said mass of dough is cooked to a greater extent of time and temperature than the remaining portion of said dough.

The invention further contemplates using proteinaceous adhesives in a range of about 4 to about 60 percent of the final product. Either one or a combination of the following proteinaceous adhesives may be utilized to form the 4 to 60 percent, however, alkali modified oil seed vegetable proteins such as alkali modified soy protein isolate, alkali modified soy protein concentrates, or alkali modified soy flour or meal, or alkali modified wheat gluten are preferred. Economically, alkali modified soy flour would be most preferred.

Proteinaceous adhesives are of two general classes, natural and modified. Examples of natural proteinaceous adhesives are collagen, albumens, and casein and its single salts such as sodium caseinate, calcium caseinate, ammonium caseinate, potassium caseinate, and magnesium caseinate.

Examples of proteinaceous adhesives derived by modification of natural proteins are alkali modified oil seed vegetable proteins such as alkali modified soy protein isolates, alkali modified soy proteinates, alkali modified soy flours, alkali modified soy concentrates, alkali modified wheat gluten, alkali modified cottonseed flour, alkali modified cottonseed protein isolates, alkali modified peanut flour or meal, alkali modified peanut protein isolate, and other alkali modified proteins such as contained in or derived from products such as yeast, blood, albumen, keratins, myosin, and other food proteins wherein the modification consists of the salts or proteinates such as sodium caseinate, calcium caseinate and the like.

The term "modified protein" and "alkali modified protein" is used interchangeably herein. By modified or alkali modified protein is meant one that is subjected to an alkaline hydrolysis such as the alkaline hydrolysis of an oil seed vegetable protein such as that disclosed in application Ser. No. 478,751, filed June 12, 1974 by Kumar et al., which is hereby incorporated by reference. Generally this modification proceeds by forming an aqueous slurry of a protein material containing at least 50 percent protein. The pH of the slurry is then adjusted to a pH of from 7 to 10.5 by adding to the aqueous slurry an alkali metal carbonate. A pH of about 8 is preferable. The slurry is then heated to react the protein with the alkali metal carbonate. The reaction temperature required depends upon the specific protein used but generally ranges from 295°–310°F. The slurry is then neutralized to a pH of from 6.6 to 7.0 by the addition of an edible acid. If desired, the protein may be subjected to a fermentation with a yeast before forming the aqueous slurry. The slurry may be added to the mixture directly as a slurry or it may be dried first to remove most of the water.

Plasticizing agents utilized within the scope of the invention include glycerol, sorbitol, 1,3-butanediol, mannitol, propylene glycol, and other equivalent plasticizers suitable for food use. These may include corn molasses, monoglycerides of fatty acids, sugar or corn syrup between 20–50 dextrose equivalents, fats, and oils, Especially useful are the sugar and corn syrups. The quantitative range of plasticizing agent utilized in the present invention ranges from about 2 percent to about 40 percent of each example within the final product. While the plasticizing agents listed or a combination of those listed may be used, it is preferable that from 2–15 percent of the dough within the final product consist of sorbitol.

It is within the scope of the present invention to include amylaceous ingredients within the final product. As much as 25 percent may be utilized. However, it is preferable that the amount of amylaceous ingredients be minimized or even eliminated in order to enhance and maintain the meat-like texture, even upon storage. A great amount of amylaceous ingredients will yield a product less resembling meat in texture, especially during storage.

By "amylaceous ingredients" is meant those foodstuffs containing a preponderance of starch and/or starch-like material. Examples of amylaceous ingredients are cereal grains and meals or flours obtained upon grinding cereal grains such as corn, oats, wheat, milo, barley, rice, and the various milling by-products of these cereal grains such as wheat feed flour, wheat middlings, wheat mixed feed, wheat shorts, wheat red dog, oat groats, hominy feed, and any other such material. Also included as sources of amylaceous ingredients are the tuberous foodstuffs such as potatoes, tapioca, and the like. Other examples of amylaceous ingredients are the various edible grain or tuberous starches and modified starches.

By the term "modified starch" we mean the use of thin-boiling (acid or oxidized treatment) or thick-boiling regular grain or tuberous starch, high amylose corn starch or waxy starch, or combinations thereof, either pregelatinized before, after, or distinct from the treatment with crosslinking agents such as sodium trimetaphosphate or phosphorus oxycloride alone or in conjunction with alkylating agents such as propylene oxide, or acetylating agents such as acetic anhydrides.

The invention contemplates the use of sugar because of its carbohydrate value as well as its adequacy as a plasticizer and a filler. As much sugar as 35 percent by weight of the final product may be utilized, however, it may be eliminated entirely and replaced by using a greater amount of the other ingredients.

Generally, the dry pet food of this invention having a marbled meat-like texture and appearance can be produced by blending a mixture of a protein source, fat, sugar, a proteinaceous adhesive, a plasticizing agent, and sufficient water for processing and then cooking said mixture in an uneven manner such that for a given mass of dough the product of time X temperature, hereinafter referred to as processing units, employed in cooking a portion of said given dough mass is at least 50 processing units and up to about 1,500 processing units greater than the product of time X temperature employed in cooking the remaining portion of said given dough mass, and then blending the two said portions in a manner designed to admix the portions one with another so that discrete boundaries separating the randomly intermixed portions are discernable. The cooked mixture is discharged from the cooking vessel onto a continuous conveyor or receiving surface or receptacle, cooled, and subdivided. By "subdivided" is meant that the extrudate is severed and cut into bite-size pieces.

Uneven cooking may be accomplished by extruding a mass of dough through a heated extruder barrel having little or no back pressure so that homogenous mixing of the mass coming through the extruder is prevented. By preventing homogenous mixing, the portions of the dough mass contacting the walls of the extruder barrel will be heated and cooked to a greater extent than the mass of dough in the center which does not contact the walls. Thus, by controlling the retention time one portion of the dough mass may be subjected to between 50 and 1,500 processing units more than a second portion of the dough mass.

By sufficient water for processing is meant that amount of water required not only to produce a product having a moisture content of less than 15 percent but also any additional water required to process the mixture into a pet food product.

The FIGURE represents a schematic illustration of the process of the invention. The blended ingredients are introduced into a screw extruder 11 having a heated jacket 12. The ingredients are conveyed and cooked in the extruder and discharged onto a conveyor belt 13. If desired a water cooled conveyor system may be utilized. The cooked extrudate is then cooled while on the conveyor or by conventional means, such as fans 14 and passed through a dicing machine 15 whereby the cooked extrudate is cut into bite size pieces and packaged. The bite size pieces may be further coated with fats, oils, flavorants, shellacs or other coatings. After dicing, but prior to packaging, it may be beneficial to further cool the product utilizing conventional means such as fans 16. Any suitable dicing machine may be used for this function, but one illustration of such a machine is found in U.S. Pat. No. 2,690,011.

The type of conveyor surface receiving the extrudate depends upon the specific formulation and desired texture and appearance of the final product and is readily determinable by one of ordinary skill in the art. For a smooth surface final product the preferred type of conveyor surface for this invention is a smooth surface at ambient temperature. The rate of transport of the extrudate through the screw extruder onto the continuous conveyor immediate to the discharge of the cooker extruder is dependant upon the specific formulation and desired texture and appearance of the final product as well as the specific type of extruder utilized and is felt to be within the skill of the art. It is necessary, however, to maintain a back pressure within the extruder below 50 psig. If the back pressure becomes too great, the degree of mixing in the extruder increases and the marbled effect is lost. Thus, extrusion of the product is directly through the extruder head onto the continuous conveyor without the use of dies such as pipe extensions beyond the extruder head.

In order to further illustrate the novel aspects of the present invention, the following examples are presented. In the examples percentages are by weight based on the weight total of the ingredients used in processing.

EXAMPLE 1

| Ingredient | % by weight |
| --- | --- |
| Alkali modified soy protein isolate | 19.54 |
| Defatted soy flour | 4.88 |
| Meat and bone meal | 4.88 |
| Sodium caseinate | 4.88 |
| Sucrose | 27.84 |
| Beef trimmings | 4.88 |
| Sorbitol | 9.77 |
| Prime steam lard | 1.95 |
| Dicalcium phosphate dihydrate | 4.79 |
| Potassium chloride | 0.98 |
| Potassium sorbate | 0.29 |
| Trace minerals - vitamin | 0.59 |
| Iron oxide | 0.04 |
| Water | 14.69 |

A dry pet food having a soft, elastic, meat-like texture and marbled appearance and which contains less than 15 percent moisture was produced from the above ingredients in the following manner.

The dry ingredients are added to a 200-lb. ribbon mixer and mixed for 1 minute. The net ingredients are combined in a tub, hot water added and mixed by stirring, allowing for at least partial melting of the fat. The mixture is then poured onto the dry mix in the mixer while the mixer is running and blended for 3 minutes. The mix is then fed into a 2½ inch diameter screw extruder having a screw with a compression ratio of 2 and a pitch of 1.8, a profile of 14-5-5, a flight depth of 40.464 inches in the feed section and 0.227 inch in the metering section. Rpm of the screw is 140, and back pressure varied between 5 to about 50 psig. The production rate or throughput rate is 200–250-lb. per hour. Steam jacket pressure for heating the extruder varies between 0 to about 40 psig on each of 7 heating zones on the extruder barrel. Under these operating conditions, the marbled extrudate contains a portion cooked at a level of 1,500 processing units of seconds X degrees Fahreiheit whereas the remaining portion cooked at a level of 1,800 processing units of seconds X degrees Fahrenheit. The mean temperature of the extrudate leaving the extruder is in the 150°–180°F. range. The extrudate is then discharged onto an air-cooled conveyor. The speed of the conveyor belt is adjusted so as to obtain a steady stream of extrudate on the belt. A speed setting of 12 feet per minute is used to produce the product of the present example. The product is then cooled and cut into bite size pieces. The product has a soft, marbled appearance, is firm, non-sticky and temperature stable.

The procedure of Example 1 is repeated utilizing the ingredients of Examples 2–7 respectively. In each, a product is obtained that resembles meat in appearance and texture and remains so during normal storage.

EXAMPLE 2

| Ingredients | % by weight |
| --- | --- |
| Modified soy flour | 45 |
| Meat and bone meal | 5 |
| Sucrose | 15.7 |
| Beef trimmings | 5 |
| Sorbitol | 5 |
| Prime steam lard | 2 |
| Dicalcium phosphate dihydrate | 2.88 |
| KCl | 0.3 |
| NaCl | 0.5 |
| Vitamin-minerals premix | 0.6 |
| Red No. 40 | 0.02 |
| Violet aluminum lake No. 1 | 0.002 |
| Oat flour | 5 |
| Water | 13 |

EXAMPLE 3

| Ingredients | % by weight |
| --- | --- |
| Defatted soy flour | 4.96 |
| Meat and bone meal | 4.96 |
| Sodium caseinate | 24.86 |
| Sucrose | 28.80 |
| Beef trimmings | 4.96 |
| Sorbitol | 9.92 |
| Prime steam lard | 1.99 |
| Dicalcium phosphate dihydrate | 4.86 |
| Potassium chloride | 0.99 |
| Potassium sorbate | 0.10 |
| Trace minerals-vitamin | 0.60 |
| Red No. 40 | 0.02 |
| Violet aluminum lake No. 1 | 0.0022 |
| Water | 12.98 |

EXAMPLE 4

| Ingredients | % by Weight |
| --- | --- |
| Modified soy protein isolate | 6.96 |
| Meat and bone meal | 13.10 |
| Defatted soy flour | 16.60 |
| Defluorinated phosphate | 4.10 |
| NaCl | 0.50 |
| KCl | 0.30 |
| Vitamin premix | 0.60 |
| Tallow | 6.00 |
| Propylene glycol | 7.40 |
| Iron oxide | 0.02 |
| FD&C No. 40 | 0.02 |
| Carboxymethyl cellulose | 0.40 |
| Sucrose | 25.60 |
| Water | 18.40 |

EXAMPLE 5

| Ingredients | % by weight |
| --- | --- |
| Modified soy flour | 60 |
| Meat and bone meal | 5 |
| Sucrose | 5.7 |
| Beef trimmings | 5 |
| Sorbitol | 5 |
| Prime steam lard | 2 |

-Continued

| Ingredients | % by weight |
| --- | --- |
| Dicalcium phosphate | 2.88 |
| KCl | 0.3 |
| NaCl | 0.5 |
| Vitamin mineral premix | 0.6 |
| Red No. 40 | 0.02 |
| Violet Aluminum lake No. 1 | 0.002 |
| Water | 13 |

EXAMPLE 6

| Ingredients | % by weight |
| --- | --- |
| Modified soy flour | 60 |
| Meat and bone meal | 5 |
| Sucrose | 7.7 |
| Beef trimmings | 5 |
| Sorbitol | 3 |
| Prime steam lard | 2 |
| Dicalcium phosphate | 2.88 |
| KCl | 0.3 |
| NaCl | 0.5 |
| Vitamin mineral premix | 0.6 |
| Red No. 40 | 0.02 |
| Violet aluminum lake No. 1 | 0.002 |
| Water | 13 |

EXAMPLE 7

| Ingredients | % by weight |
| --- | --- |
| Modified soy flour | 44 |
| Meat and bone meal | 5 |
| Corn syrup | 22.7 |
| Beef trimmings | 4 |
| Sorbitol | 5 |
| Prime steam lard | 2 |
| Dicalcium phosphate dihydrate | 2.88 |
| KCl | 0.3 |
| NaCl | 0.5 |
| vitamin Mineral Premix | 0.6 |
| Red No. 40 | 0.018 |
| Violet aluminum lake No. 1 | 0.002 |
| Water | 13 |

If desired, the dry pet food of the invention may be mixed with conventional dry pet foods and marketed in that manner. Such a mixture is possible due to the low mositure content of the food.

Obviously modifications of this invention are possible. It is understood, therefore, that this application is intended to cover any variations, uses, or adaptations of the invention as may be considered to be known or customary practice in the art to which the invention pertains.

Having fully described and disclosed the invention, it is claimed:

1. A method for the production of a dry pet food containing less than 15 percent moisture by weight and having a soft, elastic, meat-like texture and marbled appearance comprising the steps of:

A. blending a mixture comprising fat, a proteinaceous adhesive, a plasticizing agent, and sufficient water for processing, wherein said proteinaceous adhesive is present in an amount from about 4 to about 60 percent by weight; and said plasticizing agent is present in an amount of from about 2 to about 40 percent by weight, B. cooking while extruding a mass of said mixture in a non-uniform manner such that a portion of said mass is subject to at least 50 and up to 1,500 more processing units than the remaining portion of said mass, said processing units consisting of the product of seconds X degrees fahrenheit, and C. cooling the extruded cooked mixture.

2. A method according to claim 1 wherein said proteinaceous adhesive is an alkali modified protein.

3. A method according to claim 1 wherein said proteinaceous adhesive is an alkali modified oil seed vegetable protein.

4. A method according to claim 3 wherein said modified oil seed vegetable protein is selected from the group consisting of an alkali modified soy protein isolate, alkali modified soy protein concentrate, alkali modified soy flour or meal, alkali modified wheat gluten, and mixtures thereof.

5. A method according to claim 1 wherein said proteinaceous adhesive comprises an adhesive selected from the group consisting of sodium caseinate, calcium caseinate, potassium caseinate, ammonium caseinate, magnesium caseinate, collagen, albumen, and mixtures thereof.

6. A method according to claim 1 wherein said plasticizing agent is selected from the group consisting of glycerol, sorbitol, 1,3-butanediol, mannitol, propylene glycol, and mixtures thereof.

7. A method according to claim 6 wherein said sorbitol is present in an amount greater than 2 percent by weight but less than 15 percent by weight of the final product.

8. A method according to claim 1 wherein said plasticizing agent comprises an agent selected from the group consisting of corn molasses, corn syrup, sugar syrup and mixtures thereof.

9. A method for the production of a dry pet food containing less than 15 percent by weight moisture having a soft, elastic, meat-like texture and marbled appearance comprising the steps of:

A. blending a mixture comprising a protein source, fat, a proteinaceous adhesive, a plasicizing agent, and sufficient water for processing, wherein said proteinaceous adhesive is present in an amount of from about 4 to about 60 percent by weight and said plasticizing agent is present in an amount of from about 2 to abut 40 percent by weight; and B. cooking said mixture on a continuous screw extruder such that said mixture is cooked in a non-uniform manner wherein a portion of said mixture is subjected to at least 50 and up to 1,500 more processing units than the remaining portion of said mixture, said processing units consisting of the product of seconds X degrees fahrenheit said mixture is subjected to during extrusion processing; and extruding said mixture to form an extrudate.

10. A method according to claim 9 wherein a back pressure below 50 psig is maintained within the extruder.

11. A method according to claim 9 wherein said extrudate is cooled by blowing air at it at ambient temperature.

12. A method according to claim 9 wherein said proteinaceous adhesive is alkali oil seed vegetable protein and said plasticizing agent is selected form the group consisting of glycerol, sorbitol, corn molasses, corn syrup, sugar syrup, 1,3-butanediol, mannitol, propylene glycol and mixtures thereof.

13. A method according to claim 9 wherein said proteinaceous adhesive is selected from the group consisting of an alkali-modified soy protein isolate, alkali-modified soy protein concentrate, alkali-modified soy flour, alkali-modified wheat gluten, and mixtures thereof, and said plasticizing agent is selected form the group consisting of glycerol, sorbitol, 1,3-butanediol, mannitol, propylene glycol and mixtures thereof.

14. A method according to claim 13 wherein said sorbitol is present in an amount greater than 2 percent by weight but less than 15 percent by weight of the final product.

15. A method according to claim 9 wherein said proteinaceous adhesive is selected from the group consisting of sodium caseinate, calcium caseinate, potassium caseinate, ammonium caseinate, magnesium caseinate, collagen, albumen, and mixtures thereof.

16. A method for the production of a dry pet food having a moisture content of less than 15 percent by weight having a soft, elastic, meat-like texture and appearance comprising the steps of:

A. blending a mixture containing a protein source, fat, sugar, vitamin, mineral, and flavoring supplements, a proteinaceous adhesive and a plasticizing agent, and water sufficient for processing, wherein said proteinaceous adhesive to present in an amount ranging from about 4 to about 60 percent by weight and comprises alkali-modified soy flour, and said plasticizing agent is present in an amount ranging from about 2 to about 40 percent by weight and is selected from the group consisting of glycerol, sorbitol, 1,3-butanediol, mannitol, propylene glycol and mixtures thereof; said sorbitol being present in an amount ranging from 2–15 percent by weight of the final product;

B. heating said mixture in an extruder barrel at a temperature between 140°F. and 190°F. for a time sufficient to cook said mixture while maintaining a back pressure below 50 psig within the extruder.

C. discharging the cooked extrudate onto a continuous conveyor; and

D. cooling said extrudate by blowing air at ambient temperature, and cutting the cooled extrudate into bite size pieces of product.

* * * * *